United States Patent
Bartucca et al.

(10) Patent No.: US 11,102,187 B2
(45) Date of Patent: Aug. 24, 2021

(54) SYSTEMS AND METHODS FOR MANAGING WORKFLOW TRANSACTIONS INCLUDING PROTECTED PERSONAL DATA IN REGULATED COMPUTING ENVIRONMENTS

(71) Applicant: Aetna Inc., Hartford, CT (US)

(72) Inventors: James Bartucca, Bristol, CT (US); Jeffrey Alan Leach, Meriden, CT (US)

(73) Assignee: Aetna Inc., Hartford, CT (US)

( * ) Notice: Subject to any disclaimer, the term of this patent is extended or adjusted under 35 U.S.C. 154(b) by 378 days.

(21) Appl. No.: 16/280,881

(22) Filed: Feb. 20, 2019

(65) Prior Publication Data
US 2020/0267134 A1  Aug. 20, 2020

(51) Int. Cl.
| H04L 9/32 | (2006.01) |
| H04L 29/06 | (2006.01) |
| G06F 16/903 | (2019.01) |
| G06F 21/62 | (2013.01) |

(52) U.S. Cl.
CPC .... H04L 63/0485 (2013.01); G06F 16/90335 (2019.01); G06F 21/6245 (2013.01); H04L 63/0807 (2013.01)

(58) Field of Classification Search
CPC ............. H04L 63/0485; H04L 63/0807; G06F 16/90335; G06F 21/6245
USPC ........................................................ 713/170
See application file for complete search history.

(56) References Cited

U.S. PATENT DOCUMENTS

| 8,204,502 B2* | 6/2012 | Khetawat | H04W 8/04 455/436 |
| 8,316,237 B1* | 11/2012 | Felsher | H04L 9/0825 713/171 |
| 8,959,598 B2* | 2/2015 | Smith | H04W 12/068 726/5 |
| 8,997,197 B2* | 3/2015 | Nord | G06F 9/00 726/9 |

(Continued)

OTHER PUBLICATIONS

Abid Mehmood; Protection of Big Data Privacy; IEEE; 2016; pp. 1821-1834.*

*Primary Examiner* — Monjur Rahim
(74) *Attorney, Agent, or Firm* — Leydig, Voit & Mayer, Ltd.

(57) ABSTRACT

Systems, methods, and software are disclosed for managing workflow transactions including protected personal data (PPD) in regulated computing environments. The method includes determining, by a first application, that a record of a first network group includes PPD; transmitting, by the first application, a packet to an encryption logging service application in response to determining that the record includes the PPD; encrypting, by the encryption logging service application, the PPD payload and a data identification record; transmitting, by the encryption logging service application: the encrypted PPD payload, the encrypted data identification record, and an unencrypted header, to a system log database; decrypting, by the encryption logging service application, the encrypted PPD payload in response to a query of a system log database by a second network group for data contained in the unencrypted header; and transmitting, by the encryption logging service application, the decrypted PPD payload to the second network group.

20 Claims, 6 Drawing Sheets

(56) References Cited

U.S. PATENT DOCUMENTS

| | | | |
|---|---|---|---|
| 9,038,145 B2* | 5/2015 | Brown | H04L 12/1854 |
| | | | 726/4 |
| 2007/0220311 A1* | 9/2007 | Lewin | G06F 11/1471 |
| | | | 714/6.32 |
| 2014/0068257 A1* | 3/2014 | Burckard | G06F 21/10 |
| | | | 713/166 |
| 2014/0380512 A1* | 12/2014 | Sturtevant | G06F 21/85 |
| | | | 726/30 |
| 2015/0180894 A1* | 6/2015 | Sadovsky | H04L 67/22 |
| | | | 726/22 |
| 2015/0317490 A1* | 11/2015 | Carey | G06F 21/62 |
| | | | 726/26 |
| 2016/0014098 A1* | 1/2016 | Wakumoto | H04L 63/0485 |
| | | | 713/153 |
| 2016/0034709 A1* | 2/2016 | Englehardt | G06F 21/6245 |
| | | | 726/28 |
| 2016/0043996 A1* | 2/2016 | Syed Mohamed | H04L 63/0485 |
| | | | 726/1 |
| 2016/0050070 A1* | 2/2016 | Bohli | H04L 9/083 |
| | | | 713/168 |
| 2016/0080335 A1* | 3/2016 | Elzur | H04L 63/164 |
| | | | 713/171 |
| 2016/0119299 A1* | 4/2016 | Amulothu | H04L 63/0485 |
| | | | 380/255 |
| 2016/0197909 A1* | 7/2016 | Innes | H04W 12/06 |
| | | | 726/6 |
| 2017/0237720 A1* | 8/2017 | Sturniolo | H04L 69/22 |
| | | | 713/154 |
| 2020/0153802 A1* | 5/2020 | Gochi Garcia | H04L 63/166 |
| 2020/0177564 A1* | 6/2020 | Arisankala | H04L 67/141 |

* cited by examiner

SYSTEMS AND METHODS FOR MANAGING WORKFLOW TRANSACTIONS INCLUDING PROTECTED PERSONAL DATA IN REGULATED COMPUTING ENVIRONMENTS

BACKGROUND

Privacy laws and regulations in the United States and abroad require organizations to ensure that access to personal data be limited to those needing to act out the processing of the data. In addition, the European Union General Data Protection Regulation (EU GDPR) mandates that organizations must track and report on their compliance with personal data protections.

One particular area where legal requirements such as these create challenges is with the logging of machine data (data that is created by the activity of computers). Machine data from servers and applications are logged to allow for analysis and support operations. In many instances, this data is needed by support personnel to resolve system issues as well as issues with individual transactions. Having access to the data that was flowing through a system at the time of an error or failure is critical to the support process.

Protected personal data (PPD) includes personally identifying information (PII) and protected health information (PHI), among other types of information. When an application is processing PPD, that personal data may be included in published logs, which could be a violation of personal data protection laws and/or regulations. Alternatively, the personal data may be redacted in the published logs, which would impede support activities.

SUMMARY

In an exemplary embodiment, the invention provides a method for managing workflow transactions including protected personal data (PPD) in a regulated computing environment. The method includes determining, by a first application, that a workflow transaction record of a first network group includes PPD. The first network group includes users authorized to view PPD. The method includes transmitting, by the first application, a packet to an encryption logging service application in response to determining that the workflow transaction record includes PPD. The packet includes: a data identification record, a header, and a PPD payload including PPD associated with the workflow transaction record. The encryption logging service application is uniquely subscribed to by the first application. The method includes encrypting, by the encryption logging service application, the PPD payload and the data identification record. The method includes transmitting, by the encryption logging service application and to a system log database: an encrypted PPD payload, an encrypted data identification record, and the unencrypted header. The method includes decrypting, by the encryption logging service application, the encrypted PPD payload in response to a query of the system log database by a second network group for data contained in the unencrypted header. The second network group includes users not authorized to view PPD. The encryption logging service application is uniquely subscribed to by the second network group. The method includes transmitting, by the encryption logging service application, a decrypted PPD payload to the second network group.

In another exemplary embodiment, the invention provides a method for managing workflow transactions including PPD in a regulated computing environment. The method includes registering a first network group for a first application. The first network group includes users authorized to view PPD. The method includes determining, by the first application, that a workflow transaction record of the first network group includes PPD. The method includes transmitting, by the first application, a packet to a second application. The packet includes: a data identification record, a header, and a PPD payload including PPD associated with the workflow transaction record. The second application is uniquely subscribed to by the first application. The method includes encrypting, by the second application, the PPD payload and the data identification record. The encrypting step includes stateless key management. The method includes transmitting, by the second application and to a system log database: an encrypted PPD payload, an encrypted data identification record, and the unencrypted header. The method includes querying, by a second network group including users not authorized to view the PPD, the system log database for data contained in the unencrypted header. The method includes decrypting, by a third application, the encrypted PPD payload in response to the query by the second network group. The third application is uniquely subscribed to by the second network group. The decrypting step includes assigning a security definition to a decrypted PPD payload for subsequent viewing thereof by the second network group. The method includes transmitting, by the third application, the decrypted PPD payload to the second network group.

In yet another exemplary embodiment, the invention provides a non-transitory computer-readable medium including processor-executable instructions stored as software therein to manage workflow transactions including PPD in a regulated computing environment. When executed by one or more processors, the processor-executable instructions cause the processor(s) to determine, by a first application of the processor-executable instructions, that a workflow transaction record of a first network group includes PPD. The first network group includes users authorized to view PPD. When executed by the processor(s), the processor-executable instructions cause the processor(s) to transmit, by the first application and in response to determining that the workflow transaction record includes PPD, a packet to a second application of the processor-executable instructions. The packet includes: a data identification record, a header, and a PPD payload including PPD associated with the workflow transaction record. When executed by the processor(s), the processor-executable instructions cause the processor(s) to encrypt, by the second application, the PPD payload and the data identification record. When executed by the processor(s), the processor-executable instructions cause the processor(s) to transmit, by the second application and to a system log database: an encrypted PPD payload, an encrypted data identification record, and the unencrypted header. When executed by the processor(s), the processor-executable instructions cause the processor(s) to decrypt, by a third application of the processor-executable instructions and in response to a query of the system log database by a second network group for data contained in the unencrypted header, the encrypted PPD payload. The second network group includes users not authorized to view PPD. When executed by the processor(s), the processor-executable instructions cause the processor(s) to transmit, by the third application, a decrypted PPD payload to the second network group.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide an automated process to achieve secure, auditable, and regulatory compliant handling of personal data contained within logged machine data. The disclosed invention integrates a restful application program interface (API) and a scalable platform enabling information technology (IT) support personnel in regulated computing environments engaged in workflow transactions involving protected personal data (PPD) to conform to complex personal data protection laws without needing to fully understand the laws or the technology required for compliance.

The disclosed systems, methods, and software provide efficient modes for temporary and long-term storage and sharing of PPD in a manner that complies with applicable laws, while enabling prompt and effective resolution of workflow transaction errors and other operational issues arising in the regulated computing environment. Embodiments of the invention provide readily auditable transaction and support data logging, and further allow for the elimination of user-managed and shared encryption/decryption keys, which speeds workflow and support processes, reduces the occurrence of errors, and mitigates the risk of unauthorized access to and/or dissemination of regulated PPD.

Embodiments of the invention thus provide a greater utilization efficiency of computing, memory, network, bandwidth, and personnel resources, thereby accomplishing increased throughput of PPD-intensive workflow transactions using less electrical power. As compared to at least some known systems and methods for managing regulated workflow transactions involving PPD, embodiments of the disclosed invention mitigate the risk of non-compliance with data privacy laws and regulations by employing systems, methods, and software that are substantially more user-friendly, are easier to maintain and troubleshoot, and are implementable is a wide-variety of new and existing network, computing, and memory storage architectures.

Figure 1:
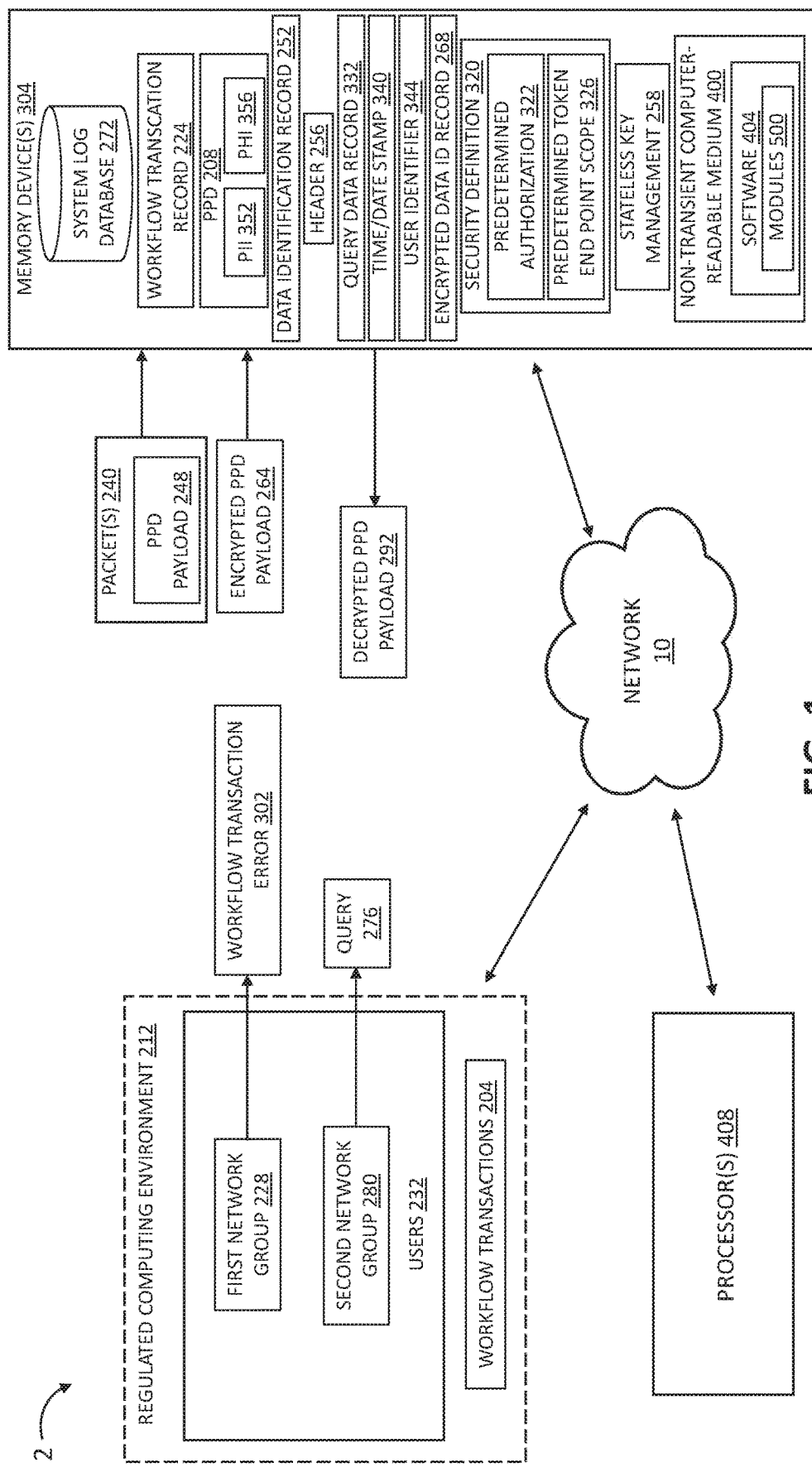
FIG. 1 is a schematic diagram of a networked computing system for managing workflow transactions including protected personal data (PPD) in a regulated computing environment.
Figure 2:
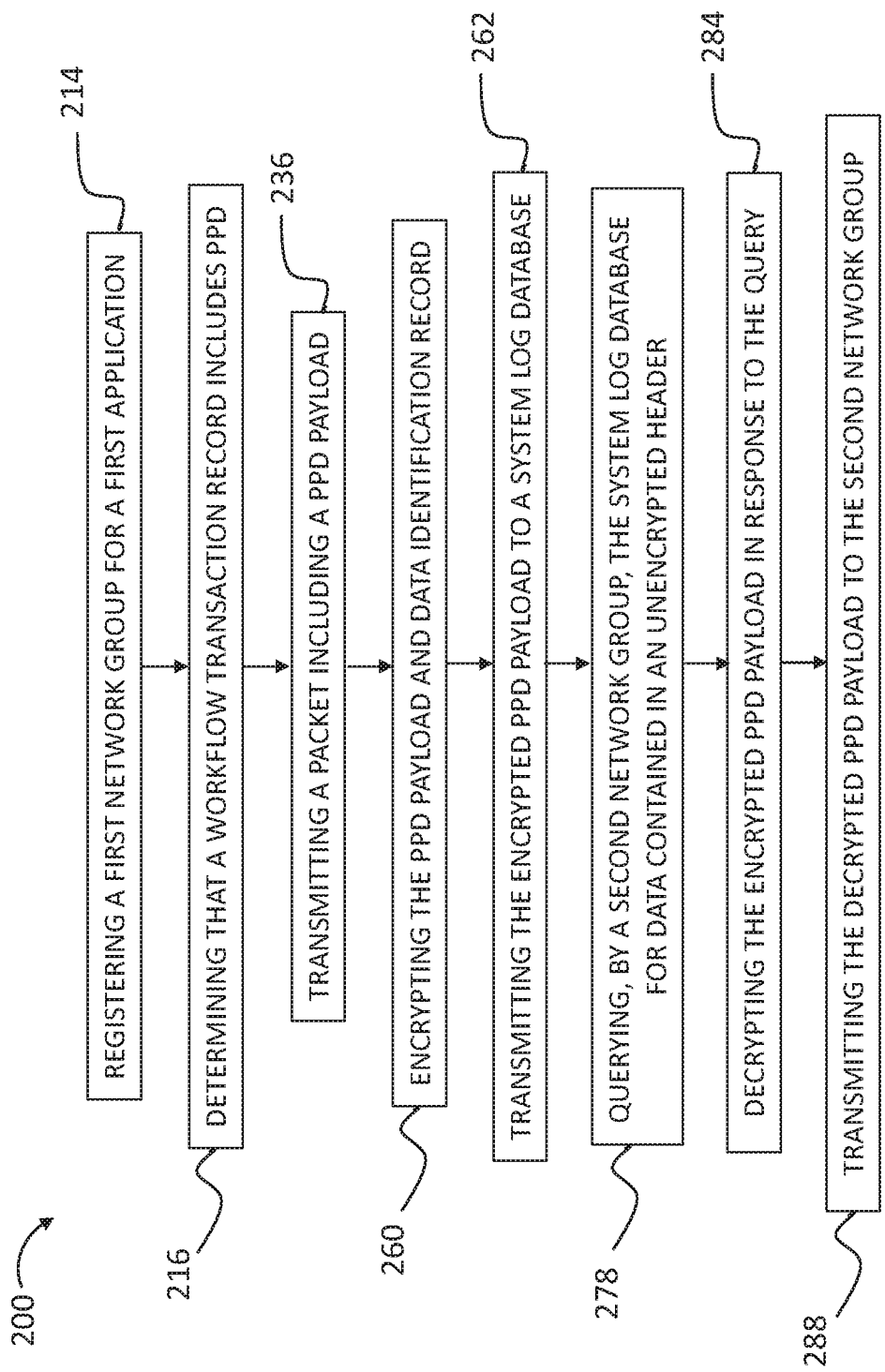
FIG. 2 is a flow chart of a method for managing workflow transactions including PPD in the regulated computing environment shown in FIG. 1 according to an embodiment of the disclosure.

FIG. 1 is a schematic diagram of a networked computing system 2 for managing workflow transactions 204 including PPD 208 in a regulated computing environment 212. FIG. 2 is a flow chart of a method 200 for managing workflow transactions 204 including PPD 208 in the regulated computing environment 212 shown in FIG. 1 according to an embodiment of the disclosure. In the examples illustrated in FIGS. 1 and 2, the method 200 shown in FIG. 2 is implemented, at least in part, using the system 2 of FIG. 1.

Referring to FIGS. 1 and 2, system 2 includes at least one processor 408 in communication with at least one memory device 304 and in communication with a regulated computing environment 212. Memory device(s) 304 include a system log database 272 stored therein. In an example, system log database 272 is searchable and includes a Splunk®-based functionality. In an example, memory device(s) 304 are also in communication with regulated computing environment 212.

Processor(s) 408 may be located in regulated computing environment 212. Processor(s) 408 may be located remote from regulated computing environment 212. In another example, system 2 may utilize processor(s) 408 that are located both in regulated computing environment 212 and remote from regulated computing environment 212. Processor(s) 408 may be included in one or more servers (not shown in FIG. 1) and/or other suitable network appliances. Similarly, memory device(s) 304 may be located in regulated computing environment 212. Memory device(s) 304 may be located remote from regulated computing environment 212. In another example, system 2 may utilize memory device(s) 304 that are located both in, and remote from, regulated computing environment 212. Memory device(s) 304 may be included in one or more servers (not shown in FIG. 1) and/or other suitable network appliances. In an example, processor(s) 408 and memory device(s) 304 are situated, and operate, in a distributed network architecture. In another example, processor(s) 408 and memory device(s) 304 are situated, and operate, in a centralized network architecture. In the embodiments disclosed herein, processor(s) 408 are programmed, and memory device(s) 304 are configured, to implement and/or otherwise perform, at least in part, one or more of the disclosed steps of method 200, including, without limitation, using system 2.

In an example, memory device(s) 304 include at least one non-transient computer-readable medium 400. Non-transient computer-readable medium 400 stores as software 404 processor 408—executable instructions for managing workflow transactions 204 including PPD 208 in the regulated computing environment 212. In an example, processor 408—executable instructions stored as software 86 include one or more software modules 500. When executed by the processor(s) 408 that are in communication with memory device(s) 304, the processor 408—executable instructions cause the one or more processors 408 to implement and/or otherwise perform, at least in part, one or more of the disclosed steps of method 200, including, without limitation, using system 2.

In system 2, processor(s) 408, memory device(s) 304, and/or regulated computing environment 212 are in communication with one another via, and communicate with one another using electrical, electromagnetic, magnetic, optical, and/or other suitable signals (e.g., encoded data signals) sent and/or received through, a network 10. In an example, system 2 communication using network 10 includes wireless communication equipment and protocols. In another example, system 2 communication using network 10 includes wired communication equipment and protocols. In yet another example, system 2 communication using network 10 includes a combination of wireless and wired communication equipment and protocols. In an example, system 2 communication includes wireless and/or wired communication equipment and protocols for utilizing cloud-based data processing, data storage, and/or data communication resources.

In an example, regulated computing environment 212 includes one or more users 232 who perform and/or otherwise facilitate, at least in part, workflow transactions 204. User(s) 232 may include human user(s), user(s) composed of computing resources, and/or combinations thereof. In the illustrated embodiment, user(s) 232 include a first network group 228 and at least a second network group 280.

Figure 3:
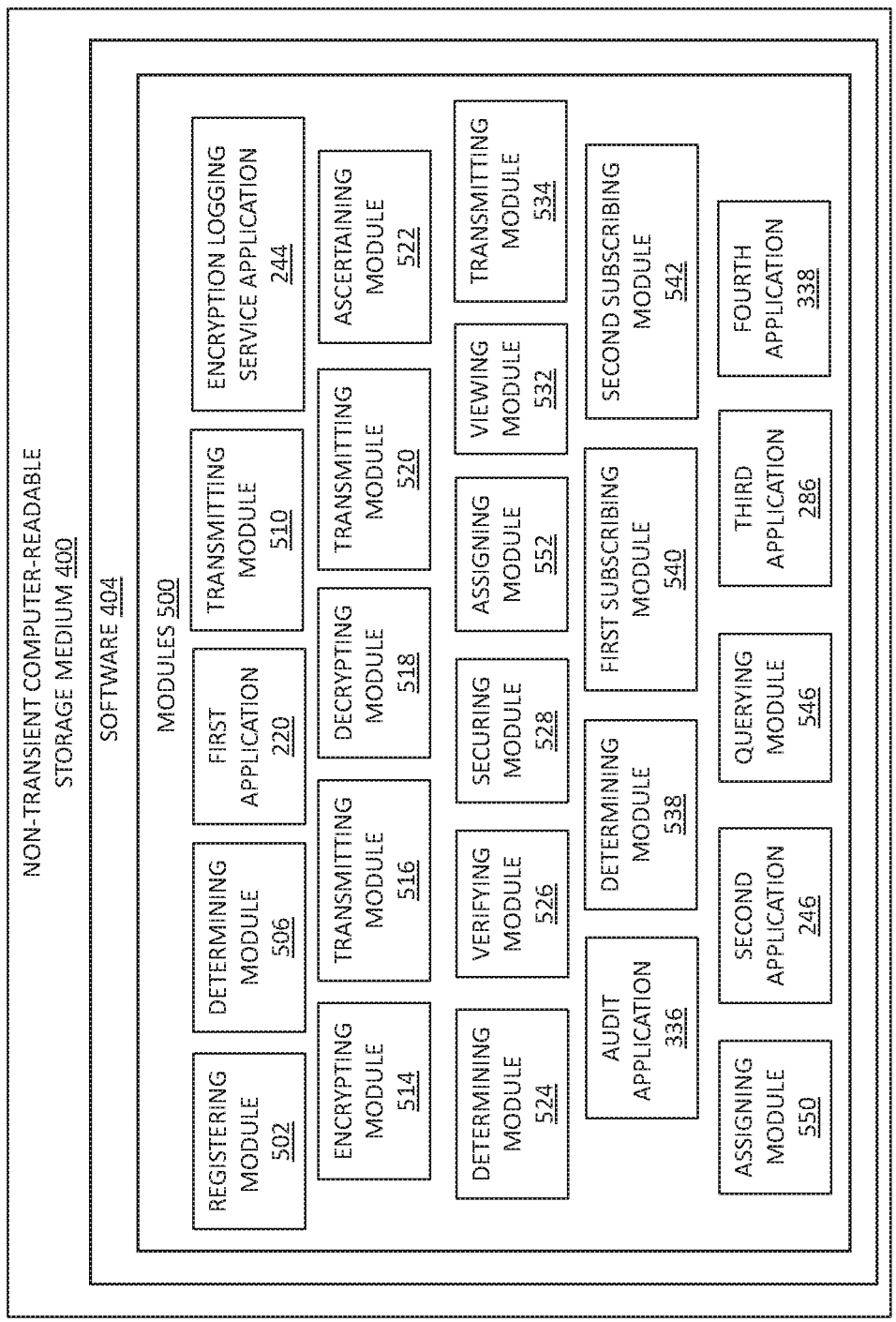
FIG. 3 is a block diagram of a software architecture for the method for managing workflow transactions including PPD shown in FIG. 2 according to an embodiment of the disclosure.

FIG. 3 is a block diagram of a software architecture for the method 200 for managing workflow transactions 204 including PPD 208 shown in FIG. 2 according to an embodiment of the disclosure. Referring to FIGS. 1-3, method 200 includes registering 214 the first network group 228 for a first application 220. In the embodiment, the first network group 228 includes user(s) 232 authorized to view the PPD 208. In embodiments for which the registering 214 step is implemented and/or otherwise performed by software 404, the processor(s) 408 execute processor 408—executable instructions stored in first application 220 and in a registering module 502.

Method 200 includes determining 216, by first application 220, that a workflow transaction record 224 of the first network group 228 includes the PPD 208. In embodiments for which the determining 216 step is implemented and/or otherwise performed by software 404, the processor(s) 408 execute processor 408—executable instructions stored in first application 220 and in a determining module 506.

Method 200 includes transmitting 236, by the first application 220, a packet 240 to a second application 246. In an embodiment, the packet 240 is transmitted 236 to the second application 246 in response to determining 216 that the workflow transaction record 224 includes PPD 208. The transmitted 236 packet 240 includes a PPD payload 248. The PPD payload 248 includes the PPD 208, a data identification record 252, and a header 256. In the embodiment, the second application 246 is uniquely subscribed to be the first application 220. In an example, the packet 240 is transmitted 236 to an encryption logging service application 244 either instead of, or in addition to, being transmitted 236 to the second application 246. In the example, the encryption logging service application 244 is uniquely subscribed to by the first application 220. In embodiments for which the transmitting 236 step is implemented and/or otherwise performed by software 404, the processor(s) 408 execute processor 408—executable instructions stored in first 220, second 246, and/or encryption logging service 244 applications and in a transmitting module 510.

Method 200 includes encrypting 260, by the second application 246, the PPD payload 248. In the embodiment, the encrypting 206 step includes encrypting 260 the data identification record 252. In an embodiment, the encrypting 260 step includes encrypting 260 the PPD payload 248 including the data identification record 252 using stateless key management 258. In an example, the encrypting 260 step includes encrypting 260 the PPD payload 248 by the encryption logging service application 244 either instead of, or in addition to encrypting 260 the PPD payload 248 by the second application 246. In embodiments for which the encrypting 260 step is implemented and/or otherwise performed by software 404, the processor(s) 408 execute processor 408—executable instructions stored in second 246 and/or encryption logging service 244 applications and in an encrypting module 514.

Method 200 includes transmitting 262, by the second application 246 and to the system log database 272, an encrypted PPD payload 264, an encrypted data identification record 268, and the unencrypted header 256. In an example, the encrypted PPD payload 264, the encrypted data identification record 268, and the unencrypted header 256 are transmitted 262 to the encryption logging service application 244 either instead of, or in addition to, being transmitted 262 to the second application 246. In embodiments for which the transmitting 262 step is implemented and/or otherwise performed by software 404, the processor(s) 408 execute processor 408—executable instructions stored in second 246 and/or encryption logging service 244 applications and in a transmitting module 516.

Method 200 includes querying 278, by the second network group 280, the system log database 272 for data contained in the unencrypted header 256. In the embodiment, the second network group 280 includes user(s) 232 not authorized to view the PPD 208. In embodiments for which the querying 278 step is implemented and/or otherwise performed by software 404, the processor(s) 408 execute processor 408—executable instructions stored in a querying module 546.

Method 200 includes decrypting 284, by a third application 286, an encrypted PPD payload 264. In the embodiment, the decrypting 284 step includes decrypting 284 the data identification record 252. In the embodiment, the third application 286 is uniquely subscribed to by the second network group 280. In an embodiment, the decrypting 284 step of method 200 includes decrypting 284 the encrypted PPD payload 264 in response to a query 276 of the system log database 272 by the second network group 280 for data contained in the unencrypted header 256. In an example, the decrypting 284 step includes decrypting 284 the encrypted PPD payload 264 by the encryption logging service application 244 either instead of, or in addition to, decrypting 284 the encrypted PPD payload 264 by the third application 286. In the example, the encryption logging service application 244 is uniquely subscribed to by the second network group 280. In an embodiment, the second 246 and third 286 applications together compose the encryption logging service application 244. In an example, the encryption logging service application 244 is or includes functionality of a secure data application, such as a Voltage (Micro Focus (D)-based application, which is accessible through a restful API. In embodiments for which the decrypting 284 step is implemented and/or otherwise performed by software 404, the processor(s) 408 execute processor 408—executable instructions stored in third 286 and/or encryption logging service 244 applications and in an decrypting module 518.

Method 200 includes transmitting 288, by the third application 286, a decrypted PPD payload 292 to the second network group 280. In an example, the transmitting 288 step includes transmitting 288 the decrypted PPD payload 292 by the encryption logging service application 244 either instead of, or in addition to, transmitting 288 the decrypted PPD payload 292 by the third application 286. In embodiments for which the transmitting 288 step is implemented and/or otherwise performed by software 404, the processor(s) 408 execute processor 408—executable instructions stored in third 286 and/or encryption logging service 244 applications and in a transmitting module 520.

Figure 4:
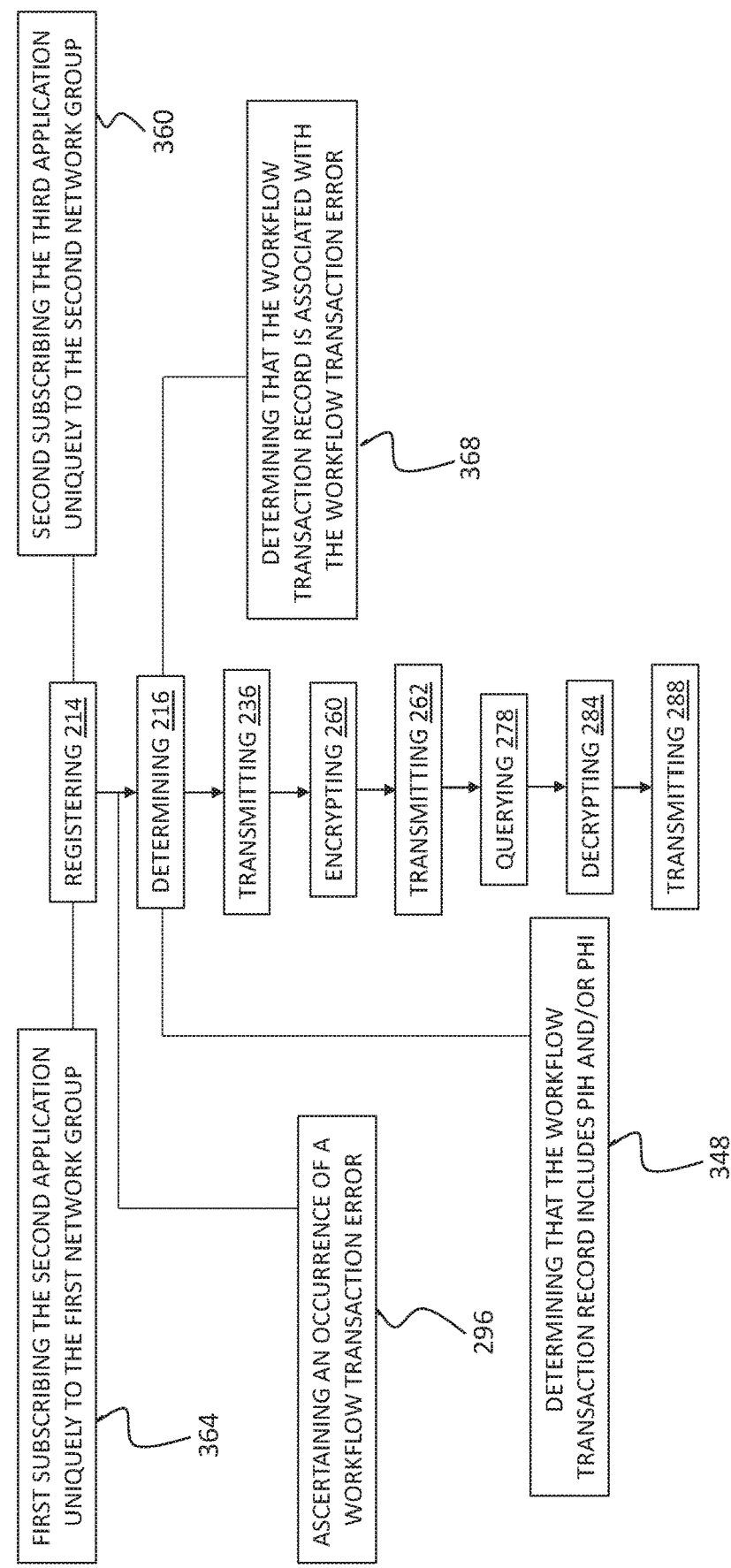
FIG. 4 is a flow chart illustrating aspects of the method for managing workflow transactions including PPD shown in FIG. 2 according to embodiments of the disclosure.
Figure 5:
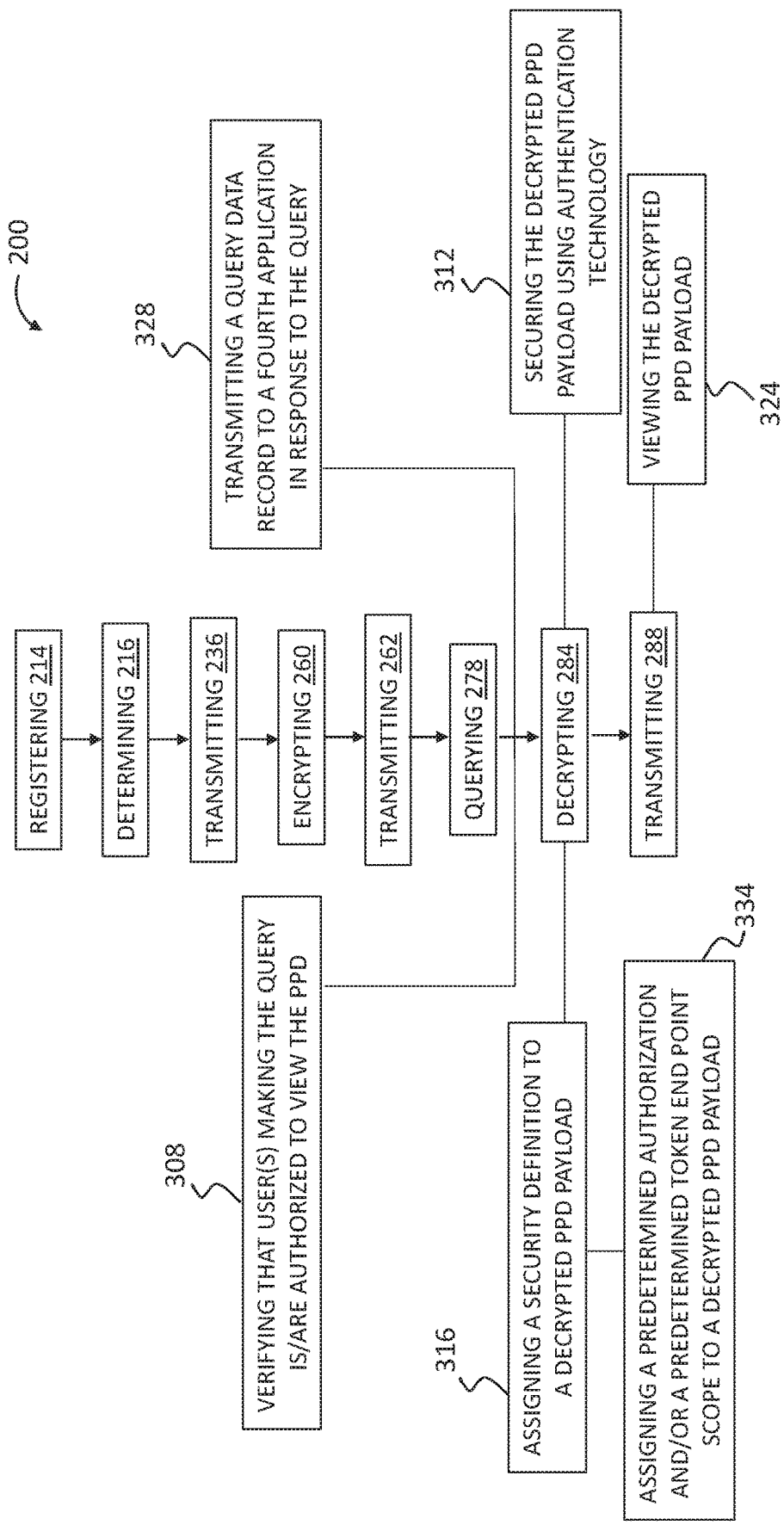
FIG. 5 is a flow chart illustrating aspects of the method for managing workflow transactions including PPD shown in FIG. 2 according to embodiments of the disclosure.

FIGS. 4 and 5 are flow charts of aspects of the method 200 for managing workflow transactions 204 including PPD 208 shown in FIG. 2 according to embodiments of the disclosure. Referring to FIGS. 1-4, in an embodiment, method 200 includes first subscribing 360, by the first application 220, the second application 246 uniquely to the first network group 228. In the embodiment, method 200 includes second subscribing 364, by the second application 246, the third application 286 uniquely to the second network group 280. In embodiments for which the first 360 and second 364 subscribing steps are implemented and/or otherwise performed by software 404, the processor(s) 408 execute processor 408—executable instructions stored in first 220 and second 246 applications and in first 540 and second 542 subscribing modules.

In an embodiment, method 200 includes ascertaining 296, by the first application 220, an occurrence of a workflow transaction error 302. In the embodiment, the method 200 step of determining 216 that the workflow transaction record 224 includes PPD 208 includes determining 368, by the first 220 and/or the encryption logging service 244 application(s) that the workflow transaction record 224 (e.g., the PPD-including record 224) is associated with the workflow transaction error 302. In embodiments for which the ascertaining 296 step is implemented and/or otherwise performed by software 404, the processor(s) 408 execute processor 408—executable instructions stored in the first application 220 and in an ascertaining module 522. In embodiments for which the determining 368 step is implemented and/or otherwise performed by software 404, the processor(s) 408 execute processor 408—executable instructions stored in first 220 and/or encryption logging service 244 applications and in a determining 524 module.

In an embodiment, the method 200 step of determining 216 that the workflow transaction record 224 includes PPD 208 includes determining 348, by the first 220 and/or encryption logging service 244 application(s), that the workflow transaction record 224 includes at least one of: personally identifying information (PII) 352, and protected health information (PHI) 356. In embodiments for which the determining 348 step is implemented and/or otherwise performed by software 404, the processor(s) 408 execute processor 408—executable instructions stored in first 220 and/or encryption logging service 244 applications and in a determining 538 module.

Referring to FIGS. 1-3 and 5, in an embodiment, method 200 includes verifying 308, by the third application 286, that user(s) 232 making the query 276 is/are authorized to view the PPD 208. In an example, the verifying 308 step of method 200 is performed by the encryption logging service application 244 either instead of, or in addition to, being performed by the first application 220. In an embodiment, the authorization of user(s) 232 making the query 276 to view the PPD 208 is verified 308 in response to the query 276 of the system log database 272 (e.g., in the querying 278 step of method 200). In embodiments for which the verifying 308 step is implemented and/or otherwise performed by software 404, the processor(s) 408 execute processor 408—executable instructions stored in third 286 and/or encryption logging service 244 application(s) and in a verifying module 526.

In an embodiment, method 200 includes transmitting 328, by the third application 286, a query data record 332 to a fourth application 338. In the embodiment, the query data record 332 includes at least one of: a time/date stamp 340 of the query, a user identifier 344 for the querying user(s) 232, and the data identification record 252. In an example, the transmitting 328 step of method 200 is performed by the encryption logging service application 244 either instead of, or in addition to, being performed by the third application 286. In an example, the query data record 332 is transmitted 328 to an audit application 336 either instead of, or in addition to, being transmitted 328 to the fourth application 338. In embodiments for which the transmitting 328 step is implemented and/or otherwise performed by software 404, the processor(s) 408 execute processor 408—executable instructions stored in third 286, encryption logging service 244, and/or audit 336 application(s) and in a transmitting module 534.

In an embodiment, the decrypting 284 step of method 200 includes assigning 316 a security definition 320 to the decrypted PPD payload 292 for subsequent viewing 324 thereof by the second network group 280. In embodiments for which the assigning 316 step is implemented and/or otherwise performed by software 404, the processor(s) 408 execute processor 408—executable instructions stored in an assigning module 552. In an embodiment, the step of assigning 316 the security definition 320 to the decrypted PPD payload 292 includes assigning 334 at least one of: a predetermined authorization 322, and a predetermined token end point scope 326 to the decrypted PPD payload 292. In embodiments for which the assigning 334 step is implemented and/or otherwise performed by software 404, the processor(s) 408 execute processor 408—executable instructions stored in an assigning module 550.

In an embodiment, method 200 includes securing 312, by the third application 286, the decrypted PPD payload 292. In the embodiment, the decrypted PPD payload 292 is secured 312 using token-based authentication technology, such as Oauth. In the embodiment, the decrypted PPD payload 292 is secured 312 by the encryption logging service application 244 either instead of, or in addition to, being secured 312 by the third application 286. In embodiments for which the securing 312 step is implemented and/or otherwise performed by software 404, the processor(s) 408 execute processor 408—executable instructions stored in third 286 and/or encryption logging service 244 application(s) and in a securing module 528.

In embodiments for which user(s) 232 include human user(s) 232, method 200 includes viewing 324, by the second network group 280 the decrypted PPD payload 292 (e.g., via a display of a user 232 personal computer or other suitable workstation or computing device (not shown in FIG. 1)). In embodiments for which the viewing 324 step is implemented and/or otherwise performed by software 404, the processor(s) 408 execute processor 408—executable instructions stored in a viewing module 532.

Figure 6:
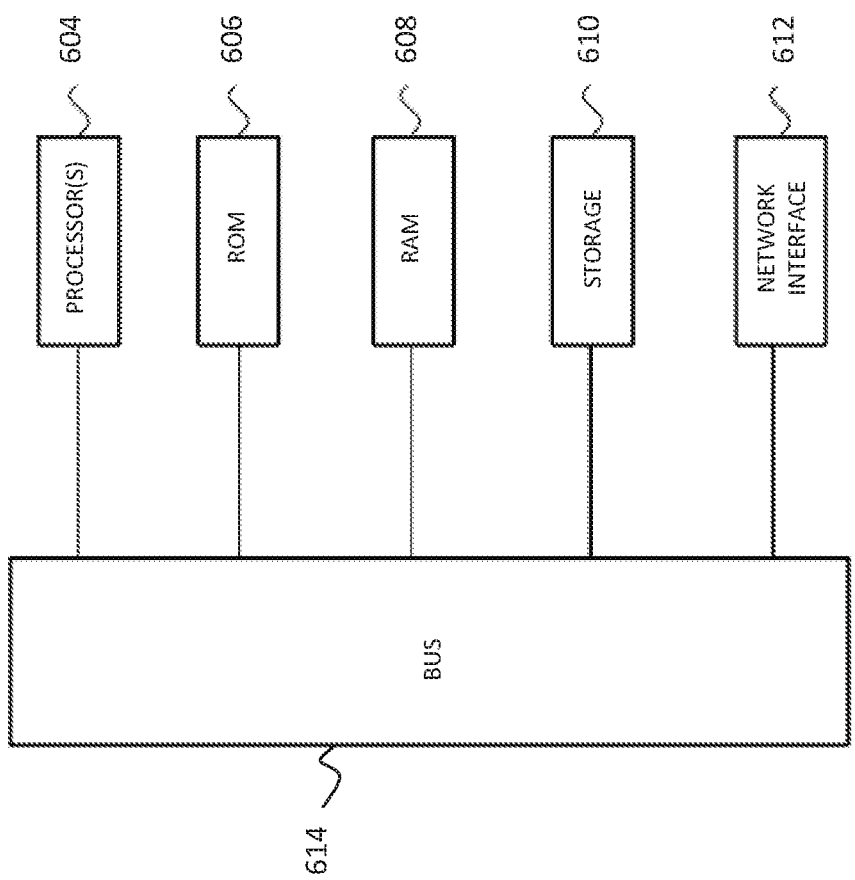
FIG. 6 is a block diagram of a processing system for implementing the disclosed systems, methods, and software according to one embodiment.

FIG. 6 is a block diagram of a processing system for implementing the disclosed systems, methods, and software according to one embodiment. The processing system includes at least one processor 604, such as a central processing unit (CPU), which executes computer-executable instructions including embodiments of the system for performing the functions and methods described above. In some embodiments, the computer-executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or cellular network and to a local area network or wide area network, such as the Internet. Processor(s) 604, ROM 606, RAM 608, storage

610, and network interface 612 may communicate with one another and/or with the network via a bus 614.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for managing workflow transactions including protected personal data (PPD) in a regulated computing environment, the method comprising:
   determining, by a first application, that a workflow transaction record of a first network group includes the PPD, wherein the first network group includes users authorized to view the PPD;
   in response to determining that the workflow transaction record includes the PPD, transmitting, by the first application, a packet to an encryption logging service application, wherein:
      the packet includes: a data identification record, a header, and a PPD payload including the PPD associated with the workflow transaction record; and
      the encryption logging service application is uniquely subscribed to by the first application;
   encrypting, by the encryption logging service application, the PPD payload and the data identification record;
   transmitting, by the encryption logging service application: an encrypted PPD payload, an encrypted data identification record, and the unencrypted header, to a system log database;
   in response to a query of the system log database by a second network group for data contained in the unencrypted header, decrypting, by the encryption logging service application, the encrypted PPD payload, wherein:
      the second network group includes users not authorized to view the PPD; and
      the encryption logging service application is uniquely subscribed to by the second network group; and
   transmitting, by the encryption logging service application, the decrypted PPD payload to the second network group.

2. The method of claim 1, further comprising ascertaining, by the first application, an occurrence of a workflow transaction error, wherein determining that the workflow transaction record includes the PPD includes determining that the workflow transaction record is associated with the workflow transaction error.

3. The method of claim 1, further comprising, in response to the query of the system log database, verifying, by the encryption logging service application and prior to decrypting the encrypted PPD payload, that a user making the query is authorized to view the PPD.

4. The method of claim 1, further comprising securing, by the encryption logging service application, the decrypted PPD payload using token-based authentication technology.

5. The method of claim 1, wherein decrypting the encrypted PPD payload includes assigning a security definition to the decrypted PPD payload for subsequent viewing thereof by the second network group.

6. The method of claim 1, further comprising transmitting, by the encryption logging service application and in response to the query, a query data record to an audit application, wherein the query data record includes: a time/date stamp of the query, a user identifier for the querying user, and the data identification record.

7. The method of claim 1, wherein determining that the workflow transaction record includes the PPD includes determining, by the first application, that the workflow transaction record includes at least one of: personally identifying information, and protected health information.

8. A method for managing workflow transactions including protected personal data (PPD) in a regulated computing environment, the method comprising:
   registering a first network group for a first application, wherein the first network group includes users authorized to view the PPD;
   determining, by the first application, that a workflow transaction record of the first network group includes the PPD;
   transmitting, by the first application, a packet to a second application, wherein:
      the packet includes: a data identification record, a header, and a PPD payload including the PPD associated with the workflow transaction record; and
      the second application is uniquely subscribed to by the first application;
   encrypting, by the second application, the PPD payload and the data identification record, wherein the encrypting includes stateless key management;
   transmitting, by the second application: an encrypted PPD payload, an encrypted data identification record, and the unencrypted header, to a system log database;

querying, by a second network group including users not authorized to view the PPD, the system log database for data contained in the unencrypted header;

decrypting, by a third application and in response to the query by the second network group, the encrypted PPD payload, wherein:

the third application is uniquely subscribed to by the second network group; and the decrypting includes assigning a security definition to a decrypted PPD payload for subsequent viewing thereof by the second network group; and transmitting, by the third application: the decrypted PPD payload to the second network group.

9. The method of claim 8, further comprising ascertaining, by the first application, an occurrence of a workflow transaction error, wherein determining that the workflow transaction record includes the PPD includes determining that the workflow transaction record is associated with the workflow transaction error.

10. The method of claim 8, further comprising, in response to the query of the system log database, verifying, by the third application and prior to the decrypting, that a user making the query is authorized to view the PPD.

11. The method of claim 8, further comprising securing, by the third application, the decrypted PPD payload using token-based authentication technology.

12. The method of claim 8, wherein assigning the security definition to the decrypted PPD payload includes assigning at least one of: a predetermined authorization, and a predetermined token end point scope, to the decrypted PPD payload.

13. The method of claim 8, further comprising transmitting, by the third application and in response to the query, a query data record to a fourth application, wherein the query data record includes at least one of: a time/date stamp of the query, a user identifier for the querying user, and the data identification record.

14. The method of claim 8, wherein determining that the workflow transaction record includes the PPD includes determining, by the first application, that the workflow transaction record includes at least one of: personally identifying information, and protected health information.

15. The method of claim 8, wherein the second and third applications together compose an encryption logging service application.

16. A non-transitory computer-readable storage medium including processor-executable instructions stored as software therein to manage workflow transactions including protected personal data (PPD) in a regulated computing environment, which, when executed by one or more processors, cause the one or more processors to:

determine, by a first application of the processor-executable instructions, that a workflow transaction record of a first network group includes the PPD, wherein the first network group includes users authorized to view the PPD;

in response to determining that the workflow transaction record includes the PPD, transmit, by the first application, a packet to a second application of the processor-executable instructions, wherein the packet includes: a data identification record, a header, and a PPD payload including the PPD associated with the workflow transaction record;

encrypt, by the second application, the PPD payload and the data identification record;

transmit, by the second application: an encrypted PPD payload, an encrypted data identification record, and the unencrypted header, to a system log database;

decrypt, by a third application of the processor-executable instructions and in response to a query of the system log database by a second network group for data contained in the unencrypted header, the encrypted PPD payload, wherein the second network group includes users not authorized to view the PPD; and transmit, by the third application, a decrypted PPD payload to the second network group.

17. The non-transitory computer-readable storage medium of claim 16, wherein, when executed by the one or more processors, the processor-executable instructions cause the one or more processors to encrypt the PPD payload and the data identification record using stateless key management.

18. The non-transitory computer-readable storage medium of claim 16, wherein, when executed by the one or more processors, the processor-executable instructions further cause the one or more processors to:

subscribe, by the first application, the second application uniquely to the first application; and subscribe, by the second application, the third application uniquely to the second network group.

19. The non-transitory computer-readable storage medium of claim 16, wherein, when executed by the one or more processors, the processor-executable instructions further cause the one or more processors to assign, by the third application, a security definition to the decrypted PPD payload for subsequent viewing thereof by the second network group.

20. The non-transitory computer-readable storage medium of claim 19, wherein, when executed by the one or more processors to assign the security definition to the decrypted PPD payload, the processor-executable instructions further cause the one or more processors to assign at least one of: a predetermined authorization, and a predetermined token end point scope, to the decrypted PPD payload.

* * * * *